(12) United States Patent
Kishimoto

(10) Patent No.: US 9,047,886 B2
(45) Date of Patent: Jun. 2, 2015

(54) OPTICAL DISK DEVICE AND METHOD FOR CONTROLLING THE SAME

(71) Applicant: PANASONIC CORPORATION, Osaka (JP)

(72) Inventor: Tomonori Kishimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 8 days.

(21) Appl. No.: 14/044,859

(22) Filed: Oct. 2, 2013

(65) Prior Publication Data

US 2014/0029399 A1 Jan. 30, 2014

Related U.S. Application Data

(63) Continuation of application No. PCT/JP2012/001695, filed on Mar. 12, 2012.

(30) Foreign Application Priority Data

Apr. 13, 2011 (JP) ................................ 2011-088981

(51) Int. Cl.
| | | |
|---|---|---|
| G11B 7/09 | (2006.01) | |
| G11B 7/00 | (2006.01) | |
| G11B 7/1392 | (2012.01) | |
| G11B 7/095 | (2006.01) | |

(52) U.S. Cl.
CPC .......... *G11B 7/13927* (2013.01); *G11B 7/0956* (2013.01)

(58) Field of Classification Search
USPC ......................................... 359/433
See application file for complete search history.

(56) References Cited

U.S. PATENT DOCUMENTS

| | | | |
|---|---|---|---|
| 6,680,886 B1 * | 1/2004 | Naohara et al. ............ | 369/44.32 |
| 2004/0037195 A1 * | 2/2004 | Sasaki et al. ............... | 369/53.19 |
| 2006/0171266 A1 * | 8/2006 | Noda ......................... | 369/44.32 |
| 2006/0262702 A1 | 11/2006 | Ide et al. | |
| 2008/0134226 A1 * | 6/2008 | Shimizu ...................... | 720/660 |
| 2010/0002552 A1 | 1/2010 | Shiozawa et al. | |
| 2010/0177620 A1 * | 7/2010 | Shimamoto ............. | 369/112.23 |

FOREIGN PATENT DOCUMENTS

| | | | |
|---|---|---|---|
| JP | 2001-023185 A | 1/2001 | |
| JP | 2005-018929 A | 1/2005 | |
| JP | 2006-323907 A | 11/2006 | |

(Continued)

OTHER PUBLICATIONS

International Search Report issued in International Application No. PCT/JP2012/001695 with Date of mailing May 22, 2012.

*Primary Examiner* — Wayne Young
*Assistant Examiner* — Dionne Pendleton
(74) *Attorney, Agent, or Firm* — McDermott Will & Emery LLP

(57) ABSTRACT

In an optical disk device, a technique for AC tilt correction with stability and following capability is provided in which, during an operation of a tracking servo mechanism, a lens shift amount obtained from a tracking control signal or a lens position error signal is measured for each of predetermined angles of rotation of an optical disk, and the measured values are averaged in a radial direction of the optical disk, and a tilt controller corrects an AC tilt based on the resulting average value.

9 Claims, 11 Drawing Sheets

(56) References Cited

FOREIGN PATENT DOCUMENTS

| JP | 2008-034050 A | 2/2008 |
| JP | 2008-176863 A | 7/2008 |
| JP | 2008-282439 A | 11/2008 |
| JP | 2010-015655 A | 1/2010 |
| WO | 2008/149557 A1 | 12/2008 |

* cited by examiner

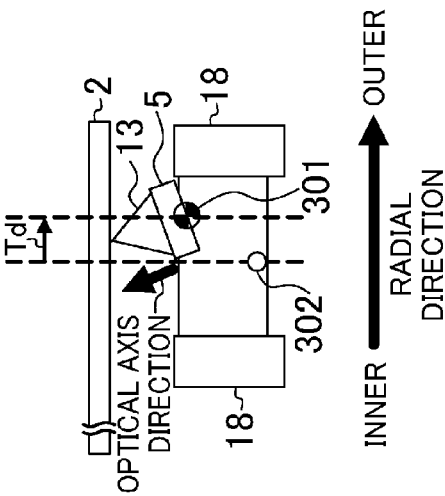
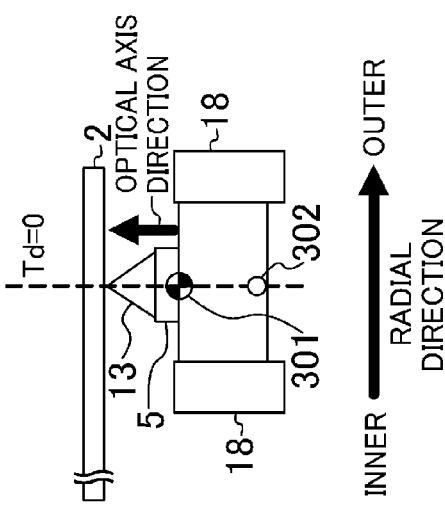
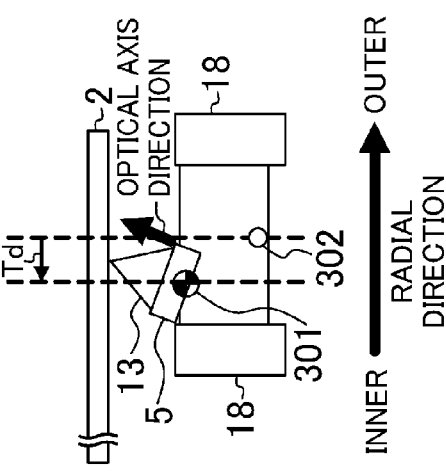

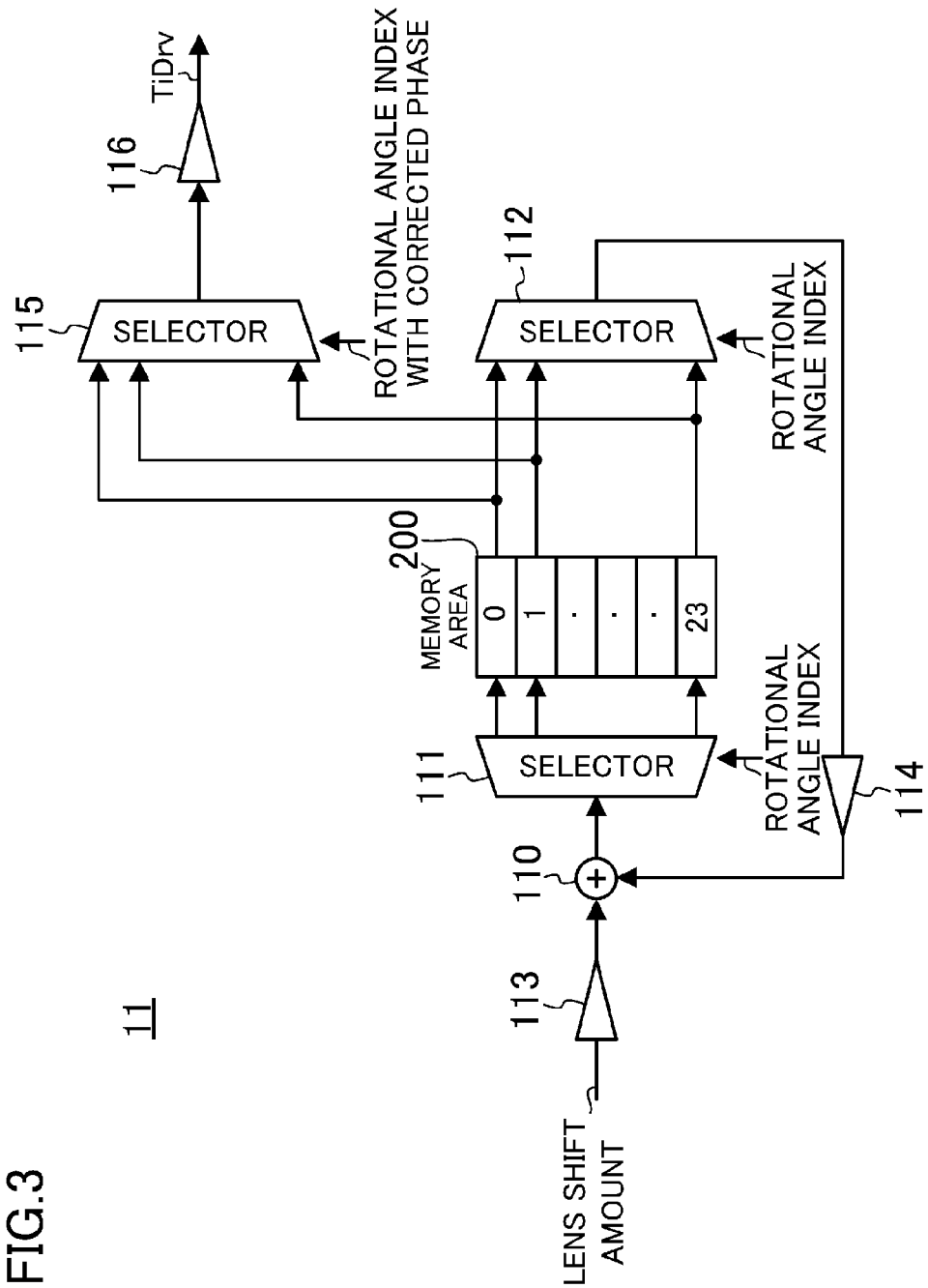

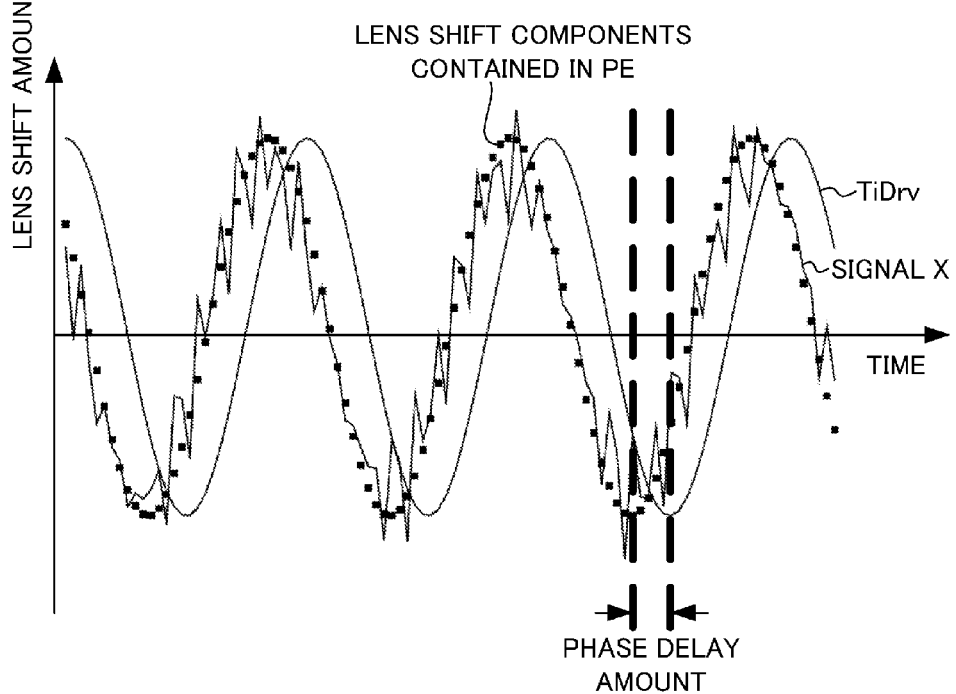

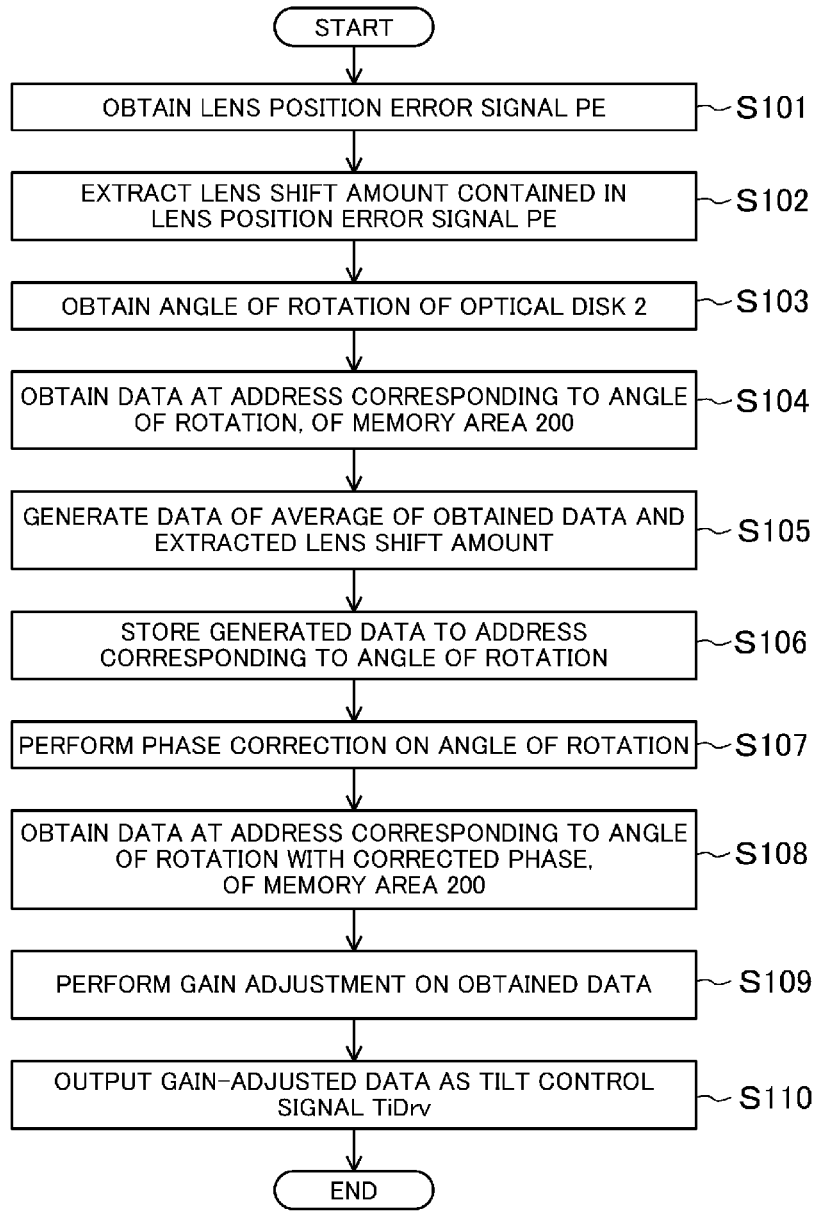

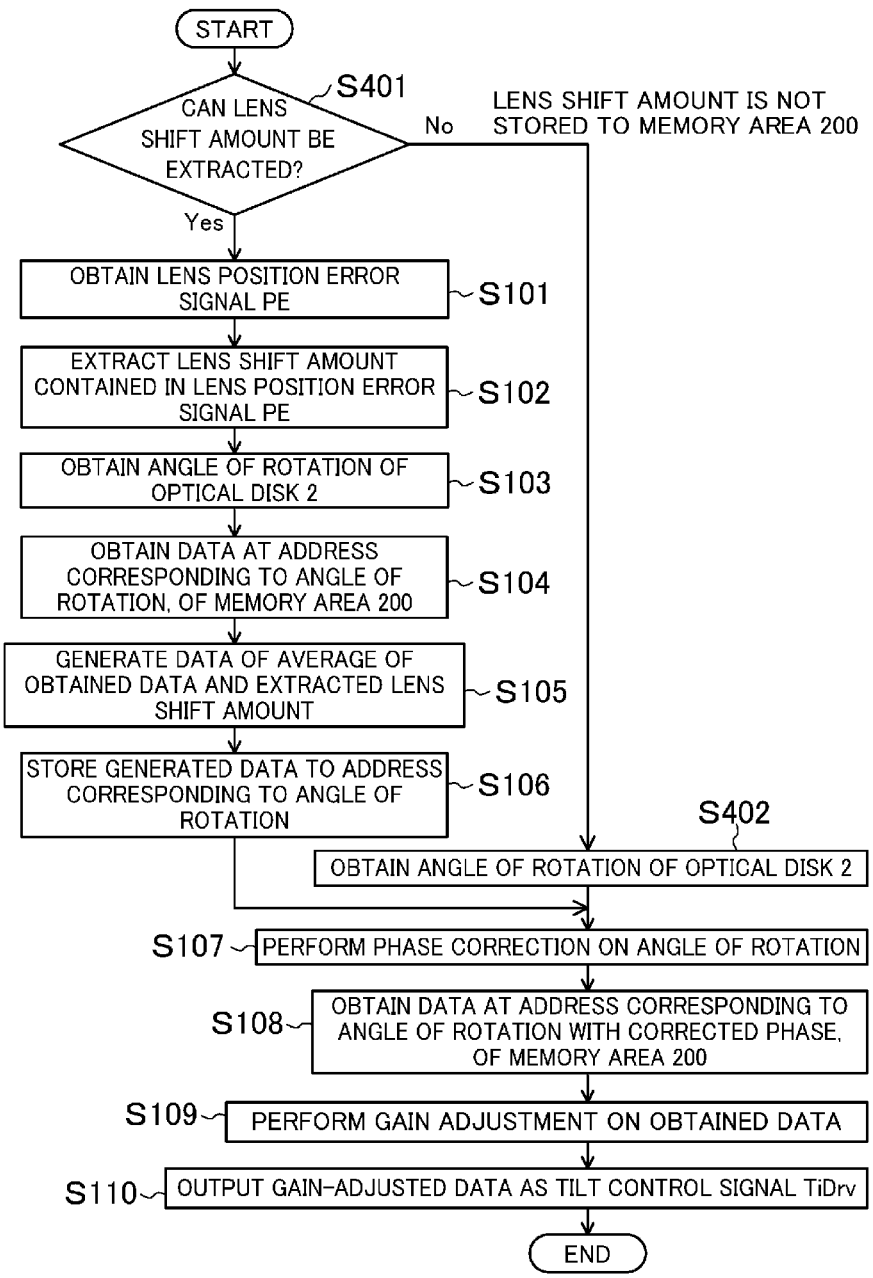

OPTICAL DISK DEVICE AND METHOD FOR CONTROLLING THE SAME

CROSS-REFERENCE TO RELATED APPLICATION

This is a continuation of PCT International Application PCT/JP2012/001695 filed on Mar. 12, 2012, which claims priority to Japanese Patent Application No. 2011-088981 filed on Apr. 13, 2011. The disclosures of these applications including the specifications, the drawings, and the claims are hereby incorporated by reference in their entirety.

BACKGROUND

The present disclosure relates to techniques of controlling an optical disk device for recording and reproducing information by irradiating a recording surface of an optical disk with laser light so that a tilt of an objective lens which is caused by a displacement of the objective lens is adjusted.

When recording and reproduction are performed on an optical disk using an optical disk device, the objective lens rolls due to tracking drive, so that the objective lens is tilted in a radial direction of the optical disk with respect to a recording surface of the optical disk. The tilt of the objective lens due to tracking drive is called an AC tilt. The AC tilt leads to a decrease in signal quality during recording and reproduction of information to and from the optical disk. Therefore, it is necessary to correct the AC tilt and thereby reduce or prevent the decrease in signal quality.

In order to correct the AC tilt, for example, the torsional rigidity of a coil spring which connects an optical pickup housing and the objective lens together may be increased. However, the increase in the rigidity leads to a decrease in drive sensitivity and therefore to an increase in heat generation and power consumption.

Alternatively, the center of gravity of the objective lens may be decreased by attaching a weight to a lower portion of the objective lens. However, the increase in weight of the objective lens leads to a decrease in responsiveness of the objective lens.

Therefore, in a conventional technique, focus position information and tracking position information are used to calculate the amount of tilt correction drive for correcting the tilt of the objective lens, whereby AC tilt correction is performed (see Japanese Patent Publication No. 2008-282439).

In another conventional technique, AC tilt correction is performed based on the number of tracks across which the optical pickup is moved without a tracking control (see International Publication WO2008/149557).

The technique of Japanese Patent Publication No. 2008-282439 has difficulty in ensuring the stability of AC tilt correction. Specifically, when the optical pickup passes a defective portion of an optical disk which is called black dot out (BDO), focus position information and tracking position information cannot be accurately extracted. Therefore, the amount of tilt correction drive is calculated using an equation of motion which governs the motion of an actuator, based on focus position information having an error with respect to correct focus position information and tracking position information having an error with respect to correct tracking position information. As a result, an error occurs in the amount of tilt correction drive. The necessity of calculation of the equation of motion increases the amount of calculation, compared to calculation of a sum of products. When the calculation is performed by hardware, the area of the hardware needs to be increased. When the calculation is performed by software, the software needs to be operated at higher speed. Therefore, the necessity of calculation of the equation of motion leads to an increase in cost of the optical disk device.

The technique of International Publication WO2008/149557 has difficulty in ensuring the following capability of AC tilt correction. After the amount of tilt correction is calculated based on the number of tracks across which the optical pickup is moved without a tracking control, the tracking control is started, and signal quality is evaluated during the start of the tracking control. Therefore, for example, if the signal quality does not reach a predetermined level, it is necessary to temporarily stop the tracking control in order to calculate the amount of tilt correction again. While the tracking control is stopped, at least one of reproduction and recording of information from and to an optical disk is not allowed, leading to an increase in the time required to activate the optical disk device.

The present disclosure describes implementations of a technique for AC tilt correction with stability and following capability in an optical disk device.

SUMMARY

In the present disclosure, a displacement amount of an objective lens from a normal position in an optical pickup in a radial direction of an optical disk is extracted as a lens shift amount, and lens shift amounts for a predetermined angle of rotation of the optical disk are averaged in the radial direction of the optical disk to obtain a lens shift amount average value for the predetermined angle of rotation of the optical disk, and tilting and driving of the objective lens in the radial direction of the optical disk are controlled based on a lens shift amount average value for each of the predetermined angles of rotation of the optical disk. The control of the tilting and driving of the objective lens for each of the predetermined angles of rotation is performed successively for all of the predetermined angles of rotation of the optical disk, whereby a tilt control can be performed throughout a surface of the optical disk.

According to the present disclosure, an AC tilt is corrected using a value obtained by averaging lens shift amounts in a radial direction of an optical disk, whereby the stability of AC tilt correction can be ensured even if a disturbance, such as BDO etc., occurs. Also, the average value is always based on the most recent lens shift amounts, whereby the following capability of AC tilt correction can be ensured.

BRIEF DESCRIPTION OF THE DRAWINGS

FIGS. 2A, 2B and 2C are schematic diagrams showing a relationship between a displacement amount and an AC tilt of an objective lens in a radial direction of an optical disk in an optical pickup of FIG. 1.

FIG. 3 is a block diagram showing a detailed configuration of a tilt controller of FIG. 1.

FIG. 4 is a diagram showing a phase delay of a tilt control signal with respect to a signal indicating a lens shift component of the optical disk device of FIG. 1.

FIG. 5 is a flowchart showing an operation of the optical disk device of FIG. 1.

FIG. 11 is a flowchart showing an operation of the optical disk device including the tilt controller of FIG. 10.

DETAILED DESCRIPTION

Embodiments of an optical disk device according to the present disclosure and a method for controlling the optical disk device will be described below with reference to the accompanying drawings.

<<First Embodiment>>

Figure 1:
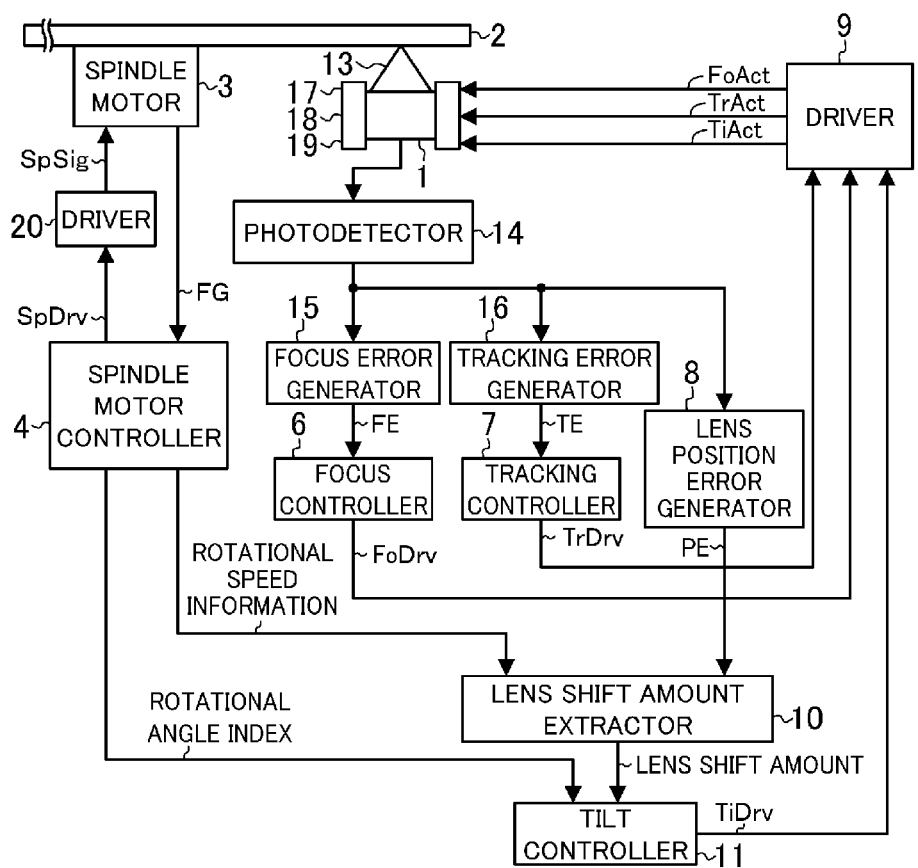
FIG. 1 is a block diagram showing an optical disk device according to a first embodiment of the present disclosure.

FIG. 1 is a block diagram showing an optical disk device 1000 according to a first embodiment of the present disclosure. The optical disk device 1000 performs at least one of reproduction and recording of information from and to an optical disk 2 by irradiating the optical disk 2 with laser light 13. Firstly, a focus servo mechanism, a tracking servo mechanism, and a spindle motor servo mechanism will be described with reference to FIG. 1.

An optical pickup 1 irradiates the optical disk 2 with the laser light 13, receives light reflected from the optical disk 2 using a photodetector 14, and converts the reflected light into an electrical signal. The electrical signal obtained by conversion of the reflected light is supplied to a focus error generator 15 and a tracking error generator 16.

The focus error generator 15 detects a deviation between the position of a data layer of the optical disk 2 and the position of a focal point of the laser light 13 based on the electrical signal obtained by conversion of the reflected light by the photodetector 14, to generate a focus error signal FE. The tracking error generator 16 detects a deviation between a groove called a track of the optical disk 2 in which information is recorded and the focal point position of the laser light 13 based on the electrical signal obtained by conversion of the reflected light by the photodetector 14, to generate a tracking error signal TE. The focus error signal FE is supplied to a focus controller 6 which then performs phase compensation, gain adjustment, etc. on the focus error signal FE to output the resulting signal as a focus control signal FoDry to a driver 9. The tracking error signal TE is supplied to a tracking controller 7 which then performs phase compensation, gain adjustment, etc. to output the resulting signal as a tracking control signal TrDry to the driver 9.

The driver 9 drives a focus actuator 17 and a tracking actuator 18 included in the optical pickup 1 based on the focus control signal FoDry and the tracking control signal TrDrv. The focus actuator 17 moves an objective lens included in the optical pickup 1 in a direction of the optical axis based on a focus drive signal FoAct output from the driver 9. The tracking actuator 18 moves the objective lens included in the optical pickup 1 in a radial direction of the optical disk 2 based on a tracking drive signal TrAct output from the driver 9. Thus, a servo loop for a focus control and a servo loop for a tracking control are formed, based on which the focus servo mechanism and the tracking servo mechanism are operated.

A spindle motor 3 outputs and supplies an FG signal which is a binary signal synchronous with the angle of rotation of the optical disk 2, to a spindle motor controller 4. The FG signal contains M (M is a positive integer) rising and falling edges during one revolution of the optical disk 2. If M is 6, the spindle motor 3 outputs a rising edge and a falling edge every 60 degrees of rotation of the optical disk 2. The spindle motor controller 4 measures the interval of at least one of the rising edge and the falling edge of the FG signal, generates a spindle motor control signal SpDry for keeping the measured value constant, and supplies the spindle motor control signal SpDry to a driver 20. The spindle motor 3 is driven based on a spindle motor drive signal SpSig output from the driver 20. Thus, a servo loop for a spindle motor control is formed, based on which the spindle motor servo mechanism is operated. The above-described spindle motor control technique is called the constant angular velocity (CAV) scheme. Note that, as another spindle motor control technique, the constant linear velocity (CLV) scheme may be employed, in which the linear velocity is kept constant based on information read from the optical disk 2.

FIGS. 2A-2C show that the tracking actuator 18 is driven by an operation of the tracking servo mechanism so that the objective lens 5 is moved in the radial direction of the optical disk 2. A center of gravity 301 of the objective lens 5 for, for example, Blu-ray discs, which is a movable portion on the optical pickup 1, is separated from a drive center 302 of a movable portion which is moved by the tracking actuator 18. This is responsible for an increase in AC tilt. FIG. 2A shows a case where the objective lens 5 is displaced from a center position of a housing of the optical pickup 1 toward the center of the optical disk 2. FIG. 2B shows a case where the objective lens 5 is located at the center position of the housing of the optical pickup 1. FIG. 2C shows a case where the objective lens 5 is displaced from the center position of the housing of the optical pickup 1 toward the outside of the optical disk 2.

As shown in FIGS. 2A and 2C, due to the tracking drive signal TrAct, the objective lens 5 is displaced from the center position of the housing of the optical pickup 1 in the radial direction of the optical disk 2, i.e., a lens shift occurs, resulting in rolling. As a result, the objective lens 5 is tilted in the radial direction with respect to a recording surface of the optical disk 2. Therefore, it is necessary to reduce or prevent the tilt of the objective lens 5 caused by the rolling.

The amount Td of a displacement in the radial direction of the objective lens 5, and the amount Tilt of an AC tilt of the objective lens 5 caused by the rolling which occurs due to the displacement of the objective lens 5, have a relationship represented by:

$$\text{Tilt} = K \times Td \times \exp(A \times R) \quad (1)$$

where K is the amount of an AC tilt per unit displacement amount in the radial direction of the objective lens 5, A is a coefficient representing the drive sensitivity of a tilt actuator 19, and R is a displacement frequency in the radial direction, i.e., a rotational frequency of the optical disk 2. As shown in Expression (1), the AC tilt amount Tilt is proportional to the displace amount Td of the objective lens 5 in the radial direction of the optical disk 2, i.e., the amount of a lens shift in the radial direction of the optical disk 2.

Therefore, the lens shift amount of the objective lens 5 in the radial direction of the optical disk 2 may be estimated, and the tilt of the objective lens 5 may be corrected in proportion to the estimated lens shift amount, whereby the tilt of the objective lens 5 which occurs due to the rolling can be reduced or prevented. Therefore, in this embodiment, the lens shift amount is estimated based on a lens position error signal PE indicating the displacement amount of the objective lens 5 in the radial direction of the optical disk 2 with reference to the center position of the housing of the optical pickup 1 including the objective lens 5.

In FIG. 1, a lens position error generator 8 detects the displacement amount of the objective lens 5 in the radial direction of the optical disk 2 based on the electrical signal obtained by conversion of the reflected light by the photodetector 14, with reference to the center position of the housing of the optical pickup 1 including the objective lens 5, to generate the lens position error signal PE. The lens position error signal PE is supplied to a lens shift amount extractor 10. The lens shift amount extractor 10 receives rotational speed information of the spindle motor 3 generated by the spindle motor controller 4 and the lens position error signal PE, and eliminates rotation components of the optical disk 2, high-frequency components which do not include lens shift components, etc. which are contained in the lens position error signal PE, to extract the lens shift amount. A low pass filter (LPF), a band-elimination filter (BEF), etc. can be used as a filter for eliminating the rotation components of the optical disk 2, the high-frequency components which do not include lens shift components, etc.

The lens shift amount extracted by the lens shift amount extractor 10 and a rotational angle index supplied from the spindle motor controller 4 are supplied to a tilt controller 11 which then generates and supplies a tilt control signal TiDrv to the driver 9. The driver 9 drives the tilt actuator 19 included in the optical pickup 1 based on the tilt control signal TiDrv. The tilt actuator 19 tilts the objective lens 5 in the radial direction of the optical disk 2 based on a tilt drive signal TiAct output from the driver 9. Thus, a tilt control is performed based on the lens shift amount detected using the lens position error signal PE.

Note that, alternatively, the objective lens 5 may be tilted in the radial direction of the optical disk 2 as follows. Two focus actuator systems may be provided. A first focus drive signal FoAct1 may be a signal obtained by adding the tilt control signal TiDry to the focus control signal FoDrv. A second focus drive signal FoAct2 may be a signal obtained by subtracting the tilt control signal TiDry from the focus control signal FoDrv. The objective lens 5 may be tilted using a differential focus control technique based on the first and second focus drive signals FoAct1 and FoAct2. For example, $$FoAct1 = G1(FoDry + TiDrv/2) \quad (2)$$

$$FoAct2 = G2(FoDry - TiDrv/2) \quad (3)$$

where G1 and G2 are each a driver gain indicating the amount of drive per unit driver input value.

A fixed (DC) tilt amount for correcting a warp in the radial direction of the optical disk 2 itself may be added to the tilt control signal TiDrv, and the resulting signal may be supplied to the driver 9.

FIG. 3 shows a detailed configuration of the tilt controller 11 of FIG. 1. A method for generating the tilt control signal TiDry will be described in detail with reference to FIGS. 1 and 3.

The spindle motor controller 4 divides each of either M rising edges or M falling edges of the FG signal output during one revolution of the optical disk 2 into L (L is a positive integer) to generate rotational angle indices. When M is 6 and L is 4, there are a total of 24 rotational angle indices ranging from 0 to 23. This means that the rotational angle index is updated every 15 degrees of rotation of the optical disk 2. The lens shift amount generated by the lens shift amount extractor 10 and the rotational angle index generated by the spindle motor controller 4 are supplied to the tilt controller 11.

In a memory area 200, the rotational angle indices are used as addresses. When M is 6 and L is 4, the memory area 200 serves as a ring buffer memory having 24 addresses. The memory area 200 stores a lens shift amount for each rotational angle index.

A value obtained by performing gain adjustment on a lens shift amount supplied to the tilt controller 11 using a first gain adjuster 113, and a value obtained by reading one corresponding to an address selected by a read selector 112 of the lens shift amounts stored in the memory area 200 and performing gain adjustment on the read lens shift amount using a second gain adjuster 114, are added together using an adder 110. The resulting value is written to an address selected by a write selector 111 in the memory area 200.

If the first gain adjuster 113 has a gain value of α (α is a value of 0-1) and the second gain adjuster 114 has a gain value of (1−α), an LPF is formed in which an address of the memory area 200 selected by the write selector 111 and the read selector 112 based on a rotational angle index supplied from the spindle motor controller 4 serves as a buffer, whereby lens shift amounts are averaged. Note that, alternatively, lens shift amounts may be averaged using a moving average filter having X taps (X is a positive integer).

If the write process to the memory area 200 is performed for each rotational angle index, the most recent lens shift amounts can be stored in the respective areas of the memory area 200. Moreover, if the write process is successively performed during at least one of reproduction and recording of information from and to the optical disk 2, lens shift amounts can be averaged in the radial direction. Thereafter, a value stored in the memory corresponding to an address selected by an output selector 115 of the average values of lens shift amounts stored in the memory area 200, is read out. A third gain adjuster 116 performs gain adjustment on the value read from the memory to generate the tilt control signal TiDrv.

The gain value of the third gain adjuster 116 is calculated based on Expression (1) representing the AC tilt amount Tilt to be:

$$K \times \exp(A \times R) \quad (4)$$

Thus, lens shift amounts are averaged and the tilt control signal TiDry is generated.

Note that the gain value of the third gain adjuster 116 may be determined based on an index of a reproduced signal which is obtained when information recorded in the optical disk 2 is reproduced. For example, the gain value of the third gain adjuster 116 may be changed when information recorded in the optical disk 2 is reproduced, and a gain which improves the index of the reproduced signal is determined.

If the tracking servo mechanism is disturbed due to BDO etc., and therefore, the tracking control signal TrDry and the lens position error signal PE are disturbed, a lens shift amount which is supplied to the tilt controller 11 by the lens shift amount extractor 10 is disturbed. However, because the average value of lens shift amounts is stored in the memory area 200, the stability of values stored in the memory is improved compared to when a lens shift amount is simply overwritten.

During at least one of recording and reproduction of information to and from the optical disk 2, the above-described step of averaging lens shift amounts for each of the predetermined angles of rotation of the optical disk 2 in the radial direction and storing the average value to the memory area 200, and the step of generating the tilt control signal TiDrv, are simultaneously performed. Therefore, the contents of the memory area 200 can be updated after activation of the optical disk device 1000, and therefore, learning before activation is not required. The data in the memory area 200 is always based on the most recent lens shift amounts, and therefore, the following capability of tilt correction can be ensured. Thus, the following capability and stability of tilt correction can be simultaneously provided. The calculation performed by the lens shift amount extractor 10 and the tilt controller 11 includes only multiplication and addition, and therefore, the amount of the calculation is smaller than when an equation of motion is used in calculation.

Next, correction of a phase of the tilt control signal TiDrv will be described with reference to FIGS. 3 and 4. The lens shift amount extractor 10 extracts a lens shift amount using an LPF, a BEF, etc. These filtering processes cause a delay in phase of a lens shift amount with respect to a signal X of FIG. 4. Similarly, the memory area 200 stores a value obtained by averaging lens shift amounts using an LPF, a moving average filter, etc. including the first gain adjuster 113 and the second gain adjuster 114. Therefore, the averaging process causes a delay in phase of a lens shift amount. This phase delay leads to a phase delay between the actual shift amount of the objective lens 5 included in the optical pickup 1 and the tilt control signal TiDrv.

The phase difference may be corrected by allowing the write selector 111 and the read selector 112, and the output selector 115, independently, to designate a memory position for storing a lens shift amount to the memory area 200, and to designate a memory position for reading a lens shift amount from the memory area 200 in order to obtain the tilt control signal TiDrv, respectively. Specifically, the position of the memory area 200 designated by the output selector 115 may be advanced with respect to the position of the memory area 200 designated by the write selector 111 and the read selector 112, by a phase which cancels the sum of the amount of a phase delay calculated from filter coefficients which are used when a lens shift amount is extracted using an LPF, a BEF, etc. in the lens shift amount extractor 10, and the amount of a phase delay calculated from filter coefficients of an LPF or a moving average filter including the first gain adjuster 113 and the second gain adjuster 114.

Note that when information recorded in the optical disk 2 is reproduced, the position of the memory area 200 designated by the output selector 115 may be adjusted with respect to the position of the memory area 200 designated by the write selector 111 and the read selector 112, to determine the amount of a phase which improves the index of the reproduced signal.

FIG. 5 shows a flowchart of a method for performing the tilt control in the optical disk device 1000. As shown in FIG. 5, the lens position error signal PE is obtained (step S101). A lens shift amount contained in the lens position error signal PE is extracted (step S102). The angle of rotation of the optical disk 2 is obtained (step S103). Data at an address corresponding to the angle of rotation of the memory area 200 is obtained (step S104). Data of an average of the obtained data and the extracted lens shift amount is generated (step S105). The generated data is stored at the address corresponding to the angle of rotation (step S106). The phase of the angle of rotation is corrected (step S107). Data at an address of the memory area 200 corresponding to the angle of rotation with the corrected phase is obtained (step S108). The gain of the obtained data is adjusted (step S109). The data with the adjusted gain is output as the tilt control signal TiDrv (step S110). A cycle of these steps is repeatedly performed.

According to this embodiment, a lens shift amount is extracted from the lens position error signal PE indicating a displacement of the objective lens 5 in the radial direction of the optical disk 2 with respect to the center position of the optical pickup 1. Therefore, a lens shift amount can be extracted even before operation of the tracking servo mechanism, i.e., before execution of reproduction or recording of information from or to the optical disk 2.

<<Second Embodiment>>

Figure 6:
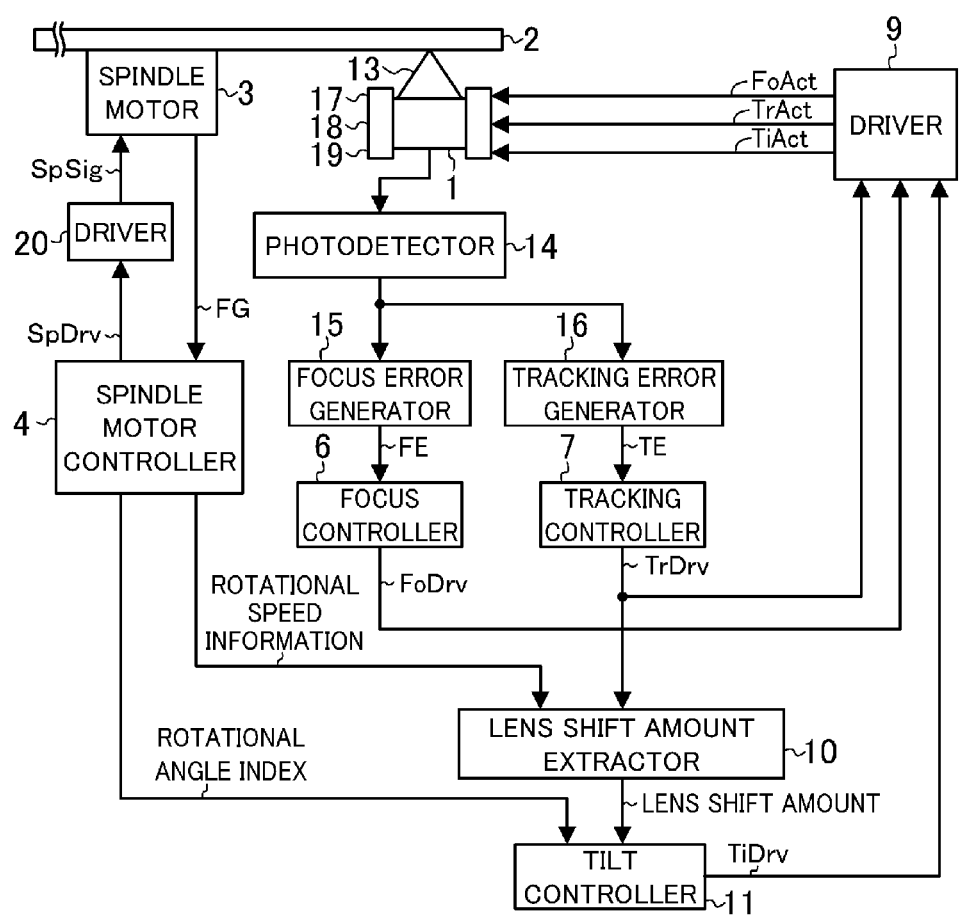
FIG. 6 is a block diagram showing an optical disk device according to a second embodiment of the present disclosure.

FIG. 6 is a block diagram showing an optical disk device 1001 according to a second embodiment of the present disclosure. Elements of the optical disk device 1001 of FIG. 6 similar to those of the optical disk device 1000 of FIG. 1 are indicated by the same reference characters and will not be described in detail.

As shown in FIG. 6, the optical pickup 1 irradiates the optical disk 2 with the laser light 13. During at least one of reproduction and recording of information from and to the optical disk 2, the tracking servo mechanism is active. At this time, the tracking control signal TrDrv output from the tracking controller 7 contains information about a position of the objective lens 5 in the radial direction of the optical disk 2. Therefore, the lens shift amount extractor 10 can extract a lens shift amount from the tracking control signal TrDrv. If a lens shift amount is extracted from the tracking control signal TrDrv, the lens position error generator 8 of FIG. 1 can be removed. As a result, the power consumption of the optical disk device 1001 of the second embodiment can be reduced compared to the optical disk device 1000 of the first embodiment.

The lens shift amount extractor 10 receives the rotational speed information of the spindle motor 3 generated by the spindle motor controller 4, and the tracking control signal TrDrv, and eliminates rotation components of the optical disk 2, high-frequency components which do not include lens shift components, etc., which are contained in the tracking control signal TrDrv, to extract a lens shift amount. An LPF, a BEF, etc. can be used as a filter for eliminating the rotation components of the optical disk 2, the high-frequency components, etc.

The lens shift amount extracted by the lens shift amount extractor 10 and the rotational angle index supplied from the spindle motor controller 4 are supplied to the tilt controller 11 which then generates and supplies the tilt control signal TiDrv to the driver 9. As a result, a tilt control is performed based on the lens shift amount detected using the tracking control signal TrDrv.

Figure 7:
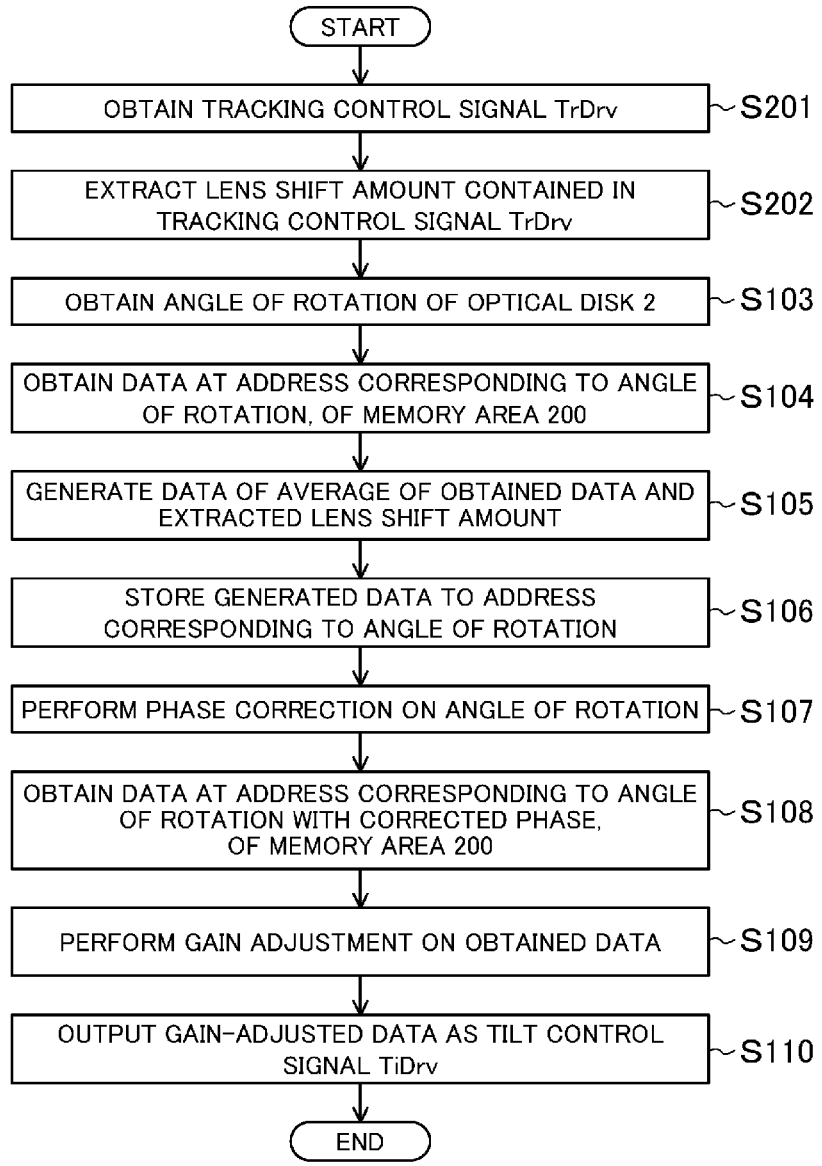
FIG. 7 is a flowchart showing an operation of the optical disk device of FIG. 6.

FIG. 7 is a flowchart showing a method for performing the tilt control in the optical disk device 1001. As shown in FIG. 7, the tracking control signal TrDrv is obtained (step S201). A lens shift amount contained in the tracking control signal TrDrv is extracted (step S202). Thereafter, steps similar to steps S103-S110 of FIG. 5 are performed based on the extracted lens shift amount.

According to this embodiment, a lens shift amount is extracted from the tracking control signal TrDrv. Therefore, even in the optical disk device 1001 which does not include the lens position error generator 8 unlike the case of FIG. 1, the AC tilt correction of the present disclosure can be achieved.

<<Third Embodiment>>

Figure 8:
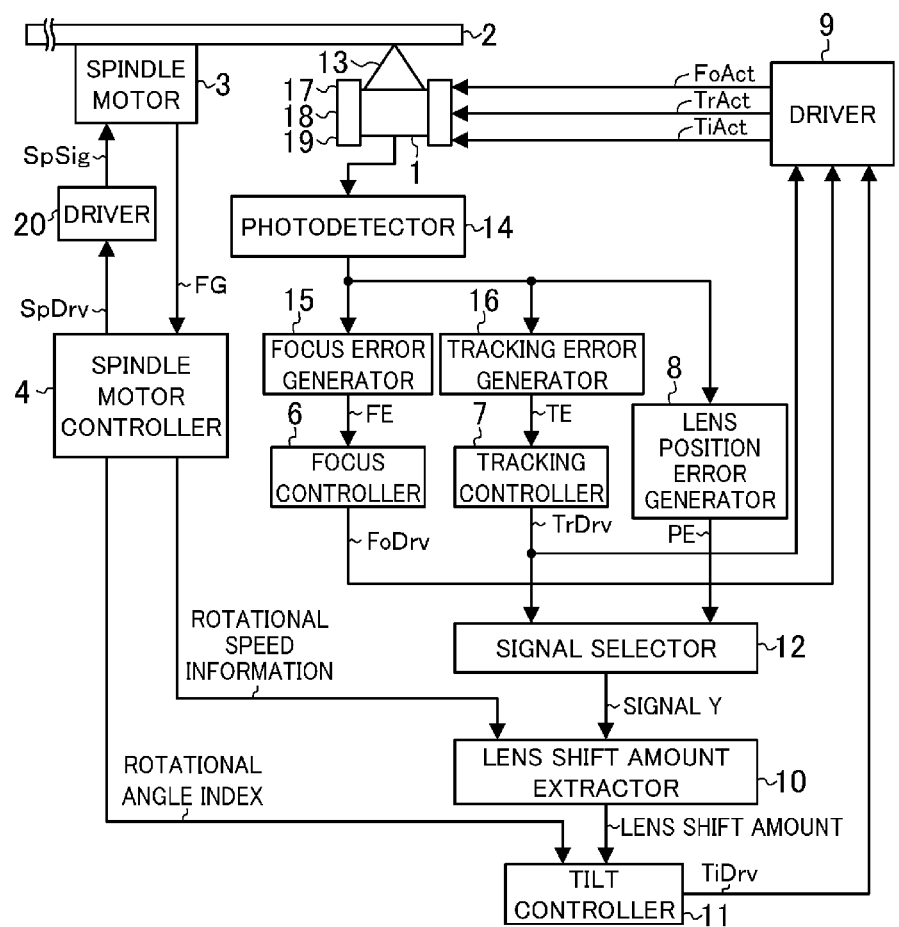
FIG. 8 is a block diagram showing an optical disk device according to a third embodiment of the present disclosure.

FIG. 8 is a block diagram showing an optical disk device 1002 according to a third embodiment of the present disclosure. Elements of the optical disk device 1002 of FIG. 8 similar to those of the optical disk device 1000 of FIG. 1 are indicated by the same reference characters and will not be described in detail.

As shown in FIG. 8, either the tracking control signal TrDry or the lens position error signal PE is selected by a signal selector 12, and supplied as a signal Y to the lens shift amount extractor 10. The lens shift amount extractor 10 receives the rotational speed information of the spindle motor 3 generated by the spindle motor controller 4 and the signal Y selected by the signal selector 12, and eliminates rotation components of the optical disk 2, high-frequency components which do not include lens shift components, etc., which are contained in the signal Y, to extract a lens shift amount. An LPF, a BEF, etc. can be used as a filter for eliminating the rotation components of the optical disk 2, the high-frequency components which do not include lens shift components, etc.

The lens shift amount extracted by the lens shift amount extractor 10 and the rotational angle index supplied from the spindle motor controller 4 are supplied to the tilt controller 11 which then generates and supplies the tilt control signal TiDry to the driver 9. As a result, a tilt control is performed based on a lens shift amount detected using the tracking control signal TrDry or the lens position error signal PE.

In the signal selector 12, either the tracking control signal TrDry or the lens position error signal PE may be selected by the following signal determining method. One of the following reproduced signals whose index is improved is selected: a reproduced signal which is obtained by reproducing information recorded in the optical disk 2 when the tracking control signal TrDry is selected; and a reproduced signal which is obtained by reproducing information recorded in the optical disk 2 when the lens position error signal PE is selected.

Figure 9:
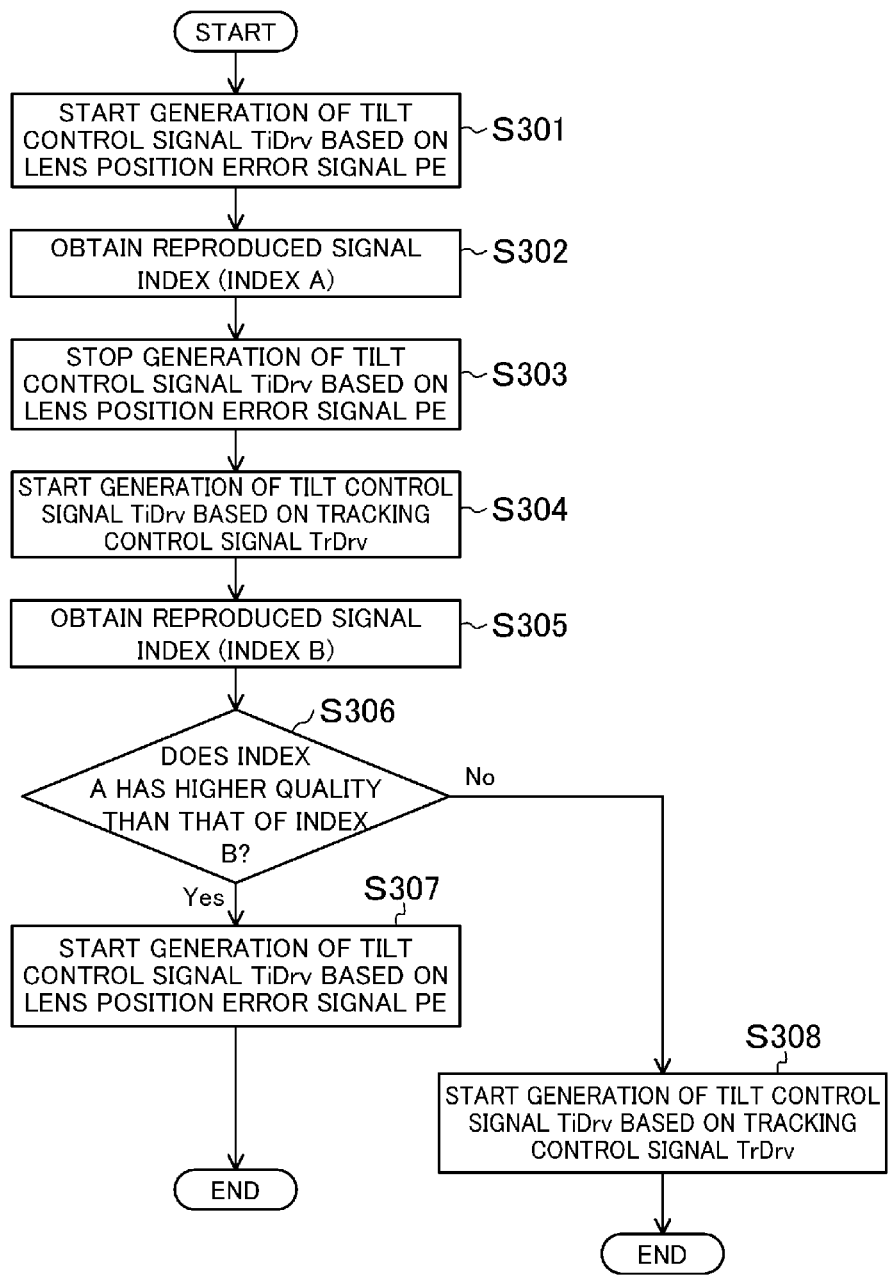
FIG. 9 is a flowchart showing an operation of the optical disk device of FIG. 8.

FIG. 9 is a flowchart showing a method for performing a tilt control in the optical disk device 1002. As shown in FIG. 9, generation of the tilt control signal TiDry based on the lens position error signal PE is started (step S301). A reproduced signal index (index A) is obtained (step S302). The generation of the tilt control signal TiDry based on the lens position error signal PE is stopped (step S303). Generation of the tilt control signal TiDry based on the tracking control signal TrDry is started (step S303). A reproduced signal index (index B) is obtained (step S305). It is determined whether the quality of the index A is higher than that of the index B (step S306). If the index A has higher quality, the generation of the tilt control signal TiDry based on the lens position error signal PE is started (step S307), and if the index B has higher quality, the generation of the tilt control signal TiDry based on the tracking control signal TrDry is started (step S308).

According to this embodiment, one of the tracking control signal TrDry and the lens position error signal PE that leads to an improvement in reproduced signal index is selected, and based on the selected signal, a lens shift amount is extracted. Therefore, this is useful for ensuring a sufficient level of signal quality of the optical disk device.

<<Fourth Embodiment>>

In the tilt control which is performed based on a lens shift amount detected using the lens position error signal PE as described in the first and third embodiments, and the tilt control which is performed based on a lens shift amount detected using the tracking control signal TrDry as described in the second and third embodiments, the tilt controller 11 simultaneously performs the step of averaging lens shift amounts for each of the predetermined angles of rotation of the optical disk 2 in the radial direction and storing the resulting value to the memory area 200 and the step of generating the tilt control signal TiDrv, during at least one of recording and reproduction of information to and from the optical disk 2, whereby the stability and following capability of tilt correction can be simultaneously achieved.

Figure 10:
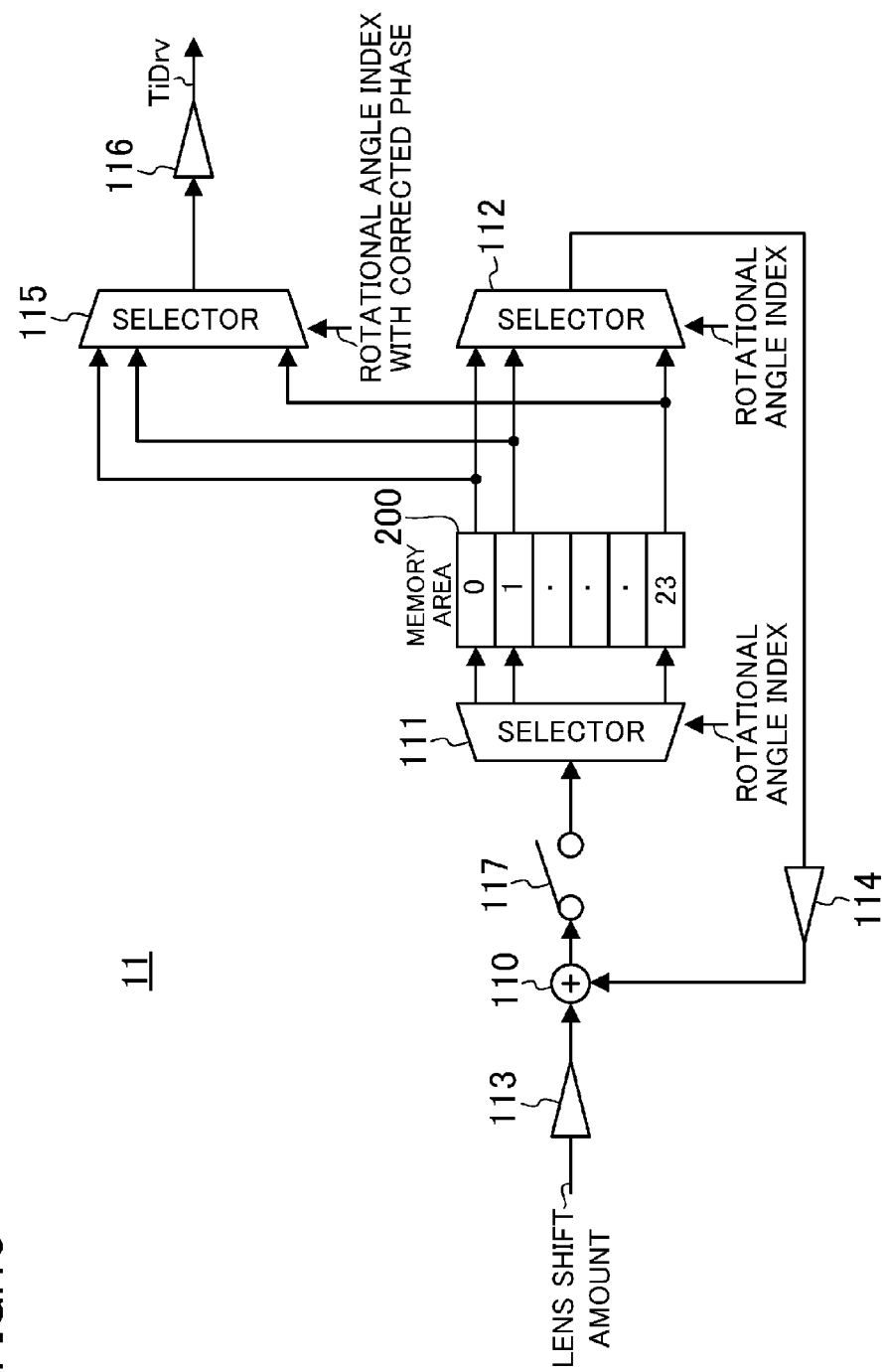
FIG. 10 is a block diagram showing a detailed configuration of a tilt controller included in an optical disk device according to a fourth embodiment of the present disclosure.

The tilt controller 11 of the fourth embodiment of FIG. 10 also performs the above-described step of averaging lens shift amounts for each of the predetermined angles of rotation of the optical disk 2 in the radial direction and storing the resulting value to the memory area 200. In addition, a switch 117 of FIG. 10 determines whether or not a lens shift amount for each of the predetermined angles of rotation of the optical disk 2 is to be stored to the memory area 200.

When the tracking servo mechanism is not active, e.g., when a process called seek in which the optical pickup 1 is moved to a target radial position of the optical disk 2, a lens shift amount cannot be extracted from the tracking control signal TrDrv. Therefore, in this case, a lens shift amount should not be stored to the memory area 200.

If the lens position error signal PE is used, even when the tracking servo mechanism is not active, a lens shift amount can be extracted. However, for example, the optical pickup 1 is moved across the optical disk 2 during the seek process, and therefore, the objective lens 5 included in the optical pickup 1 may be displaced due to the acceleration of the optical pickup 1 moving across the optical disk 2. At this time, the displacement of the objective lens 5 is different from that which is caused by the tracking servo mechanism during at least one of reproduction and recording of information from and to the optical disk 2. Therefore, a lens shift amount during the seek process should not be stored to the memory area 200.

Therefore, the switch 117 may be turned off if a lens shift amount of the objective lens 5 different from that which is caused by the tracking servo mechanism during at least one of reproduction and recording of information from and to the optical disk 2 is supplied to the tilt controller 11, and turned on otherwise, whereby only a lens shift amount caused by the tracking servo mechanism can be stored to the memory area 200.

FIG. 11 is a flowchart showing a method for performing the tilt control in the optical disk device. As shown in FIG. 11, initially, in step S401, it is determined whether or not a lens shift amount can be extracted, and if the determination result is positive, steps similar to steps S101-S110 of FIG. 5 are performed. On the other hand, if the determination result is negative, the step of storing a lens shift amount to the memory area 200 is not performed, and the angle of rotation of the optical disk 2 is obtained (step S402), and thereafter, steps similar to steps S107-S110 of FIG. 5 are performed. A cycle of these steps is repeatedly performed.

According to this embodiment, only when the tracking servo mechanism is active, a lens shift amount is stored to the memory area 200. Therefore, lens shift amounts excluding those unnecessary for AC tilt correction which are obtained before activation of an optical disk, during the seek process, etc., can be stored to the memory area 200.

A lens shift amount may be stored to the memory area 200 only when the focus servo mechanism is active. Also in this case, lens shift amounts excluding those unnecessary for AC tilt correction which are obtained before activation of an optical disk, during the seek process, etc., can be stored to the memory area 200.

Note that when the focus servo mechanism is active and the optical pickup 1 is not moved in the radial direction (e.g., the seek process is not performed, etc.), the switch 117 may be turned on so that a lens shift amount extracted from a lens center position error LPOS may be stored to the memory area 200.

As described above, the present disclosure is useful for ensuring a sufficient level of signal quality of an optical disk device which performs recording and reproduction on an optical disk. The present disclosure is also useful for providing an optical pickup having a smaller thickness and a simpler configuration in an optical disk device.

What is claimed is:
1. An optical disk device comprising:
an optical pickup including an objective lens configured to focus laser light onto an optical disk;
a tilt actuator configured to drive and tilt the objective lens in a radial direction of the optical disk;

a tilt driver configured to drive the tilt actuator;
a lens shift amount extractor configured to extract, as a lens shift amount, a displacement amount of the objective lens from a normal position in the optical pickup in the radial direction of the optical disk; and
a tilt controller configured to average the lens shift amounts for a predetermined angle of rotation of the optical disk in the radial direction of the optical disk to calculate a lens shift amount average value for the predetermined angle of rotation of the optical disk, and control the tilt driver based on a lens shift amount average value for each of the predetermined angles of rotation of the optical disk,
wherein the tilt controller has a memory area configured to store a lens shift amount average value for each of the predetermined angles of rotation of the optical disk, calculates an updated lens shift amount average value based on a lens shift amount average value read from the memory area based on a current angle of rotation of the optical disk, and a lens shift amount extracted by the lens shift amount extractor, and writes the updated lens shift amount average value to the memory area.

2. The optical disk device of claim 1, wherein the lens shift amount extractor extracts the lens shift amount based on a lens position error signal indicating the displacement amount of the objective lens in the optical pickup in the radial direction of the optical disk with reference to a center position of the optical pickup including the objective lens.

3. The optical disk device of claim 1, further comprising:
a tracking actuator configured to drive and translate the optical pickup in the radial direction of the optical disk;
a tracking driver configured to drive the tracking actuator; and
a tracking controller configured to control the tracking driver,
wherein the lens shift amount extractor extracts the lens shift amount based on a tracking control signal which is supplied from the tracking controller to the tracking driver.

4. The optical disk device of claim 3, wherein the lens shift amount extractor extracts the lens shift amount based on a signal selected to improve an index of a reproduced signal, the selected signal being selected from a lens position error signal indicating the displacement amount of the objective lens in the optical pickup in the radial direction of the optical disk with reference to a center position of the optical pickup including the objective lens, and the tracking control signal which is supplied from the tracking controller to the tracking driver.

5. The optical disk device of claim 1, further comprising:
a tracking actuator configured to drive and translate the optical pickup in the radial direction of the optical disk;
a tracking driver configured to drive the tracking actuator; and
a tracking controller configured to control the tracking driver,
wherein the tilt controller, during at least one of recording and reproduction of information to and from the optical disk, reads and writes the memory area to update a lens shift amount average value for each of the predetermined angles of rotation of the optical disk which is stored in the memory area, simultaneously with an operation of a tracking servo mechanism including the tracking actuator, the tracking driver, and the tracking controller.

6. The optical disk device of claim 1, wherein the tilt controller controls the tilt driver based on a lens shift amount average value read from a memory position different from memory positions which are used when the memory area is read and written to update a lens shift amount average value for each of the predetermined angles of rotation of the optical disk which is stored in the memory area, to correct a phase delay which occurs due to the averaging of the lens shift amounts.

7. The optical disk device of claim 1, further comprising:
a tracking actuator configured to drive and translate the optical pickup in the radial direction of the optical disk;
a tracking driver configured to drive the tracking actuator; and
a tracking controller configured to control the tracking driver,
wherein the tilt controller, when a tracking servo mechanism including the tracking actuator, the tracking driver, and the tracking controller is inactive, does not update a lens shift amount average value for each of the predetermined angles of rotation of the optical disk which is stored in the memory area.

8. The optical disk device of claim 1, further comprising:
a focus actuator configured to drive and move the objective lens in an optical axis direction of the optical pickup;
a focus driver configured to drive the focus actuator; and
a focus controller configured to control the focus driver,
wherein the tilt controller, when a focus servo mechanism including the focus actuator, the focus driver, and the focus controller is inactive, does not update a lens shift amount average value for each of the predetermined angles of rotation of the optical disk which is stored in the memory area.

9. A method for controlling an optical disk device including an optical pickup including an objective lens configured to focus laser light onto an optical disk, the method comprising:
a lens shift amount extracting step of extracting, as a lens shift amount, a displacement amount of the objective lens from a normal position in the optical pickup in a radial direction of the optical disk; and
a tilt control step of averaging the lens shift amounts for a predetermined angle of rotation of the optical disk in the radial direction of the optical disk to calculate a lens shift amount average value for the predetermined angle of rotation of the optical disk, and controlling tilting and driving of the objective lens in the radial direction of the optical disk based on a lens shift amount average value for each of the predetermined angles of rotation of the optical disk,
wherein a lens shift amount average value for each of the predetermined angles of rotation of the optical disk is stored in a memory, an updated lens shift amount average value is calculated based on a lens shift amount average value read from the memory based on a current angle of rotation of the optical disk, and a lens shift amount extracted by the lens shift amount extracting step, and the updated lens shift amount average value is written to the memory.

* * * * *